(12) United States Patent
Oyama

(10) Patent No.: US 11,294,126 B2
(45) Date of Patent: Apr. 5, 2022

(54) OPTICAL COUPLING DEVICE AND OPTICAL COMMUNICATION SYSTEM

(71) Applicant: SONY SEMICONDUCTOR SOLUTIONS CORPORATION, Kanagawa (JP)

(72) Inventor: Yusuke Oyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 361 days.

(21) Appl. No.: 16/334,560

(22) PCT Filed: Sep. 8, 2017

(86) PCT No.: PCT/JP2017/032420
§ 371 (c)(1),
(2) Date: Mar. 19, 2019

(87) PCT Pub. No.: WO2018/079091
PCT Pub. Date: May 3, 2018

(65) Prior Publication Data
US 2021/0286139 A1     Sep. 16, 2021

(30) Foreign Application Priority Data
Oct. 24, 2016  (JP) .............................. JP2016-207650

(51) Int. Cl.
G02B 6/42 (2006.01)
(52) U.S. Cl.
CPC ................. *G02B 6/4206* (2013.01)
(58) Field of Classification Search
None
See application file for complete search history.

(56) References Cited

U.S. PATENT DOCUMENTS 6,454,467 B1 * 9/2002 Ishihara ............... G02B 6/4246
385/88
7,393,145 B1   7/2008 Stevens et al.
(Continued)

FOREIGN PATENT DOCUMENTS

CN     1820215 A    8/2006
EP     1168687 A2   1/2002
(Continued)

OTHER PUBLICATIONS

International Search Report and Written Opinion of PCT Application No. PCT/JP2017/032420, dated Jan. 9, 2018, 10 pages of ISRWO.
(Continued)

*Primary Examiner* — Charlie Y Peng
(74) *Attorney, Agent, or Firm* — Chip Law Group

(57) ABSTRACT

[Object] To provide an optical coupling device that efficiently receives an optical signal from an optical fiber and has improved communication quality, and an optical communication system using the same. [Solving Means] An optical coupling device according to the present technology includes a light receiving and emitting device and an optical device. The light receiving and emitting device includes a light emitter that emits outgoing light, and a light receiver that receives incident light from outside. The light receiver has a light passing part through which the outgoing light passes. The light passing part is arranged on an optical axis of the incident light. The optical device causes incident light around the optical axis of the incident light to be refracted so as to be apart from the optical axis and to enter the light receiver.

11 Claims, 13 Drawing Sheets

(56) References Cited

U.S. PATENT DOCUMENTS

| | | |
|---|---|---|
| 2002/0006251 A1 | 1/2002 | Kim et al. |
| 2002/0085390 A1* | 7/2002 | Kiyomoto ............. F21V 7/0091 |
| | | 362/555 |
| 2006/0164738 A1 | 7/2006 | Yamamoto et al. |
| 2007/0036493 A1* | 2/2007 | Brenner ................ G02B 6/4246 |
| | | 385/89 |
| 2007/0058910 A1 | 3/2007 | Umezawa |

FOREIGN PATENT DOCUMENTS

| | | |
|---|---|---|
| JP | 55-77709 A | 6/1980 |
| JP | 55-077709 A | 6/1980 |
| JP | 0875660 A * | 3/1996 |
| JP | 08-201666 A | 8/1996 |
| JP | 09-325246 A | 12/1997 |
| JP | 10-303455 A | 11/1998 |
| JP | 2002-040305 A | 2/2002 |
| JP | 2004-326066 A | 11/2004 |
| JP | 2005-031556 A | 2/2005 |
| JP | 2006-351608 A | 12/2006 |
| JP | 2007-025143 A | 2/2007 |
| JP | 2007-079267 A | 3/2007 |
| JP | 2008-015224 A | 1/2008 |
| JP | 2010-237642 A | 10/2010 |
| JP | 2012-209345 A | 10/2012 |
| KR | 2002-0003006 A | 1/2002 |
| KR | 10-2006-0015647 A | 2/2006 |
| WO | 2005/006032 A1 | 1/2005 |
| WO | WO-2015050827 A1 * | 4/2015 ........... G03H 1/0443 |

OTHER PUBLICATIONS

Office Action for JP Patent Application No. 2018-547181, dated Aug. 24, 2021, 04 pages of English Translation and 04 pages of Office Action.

\* cited by examiner

FIG. 11A  Upon reception
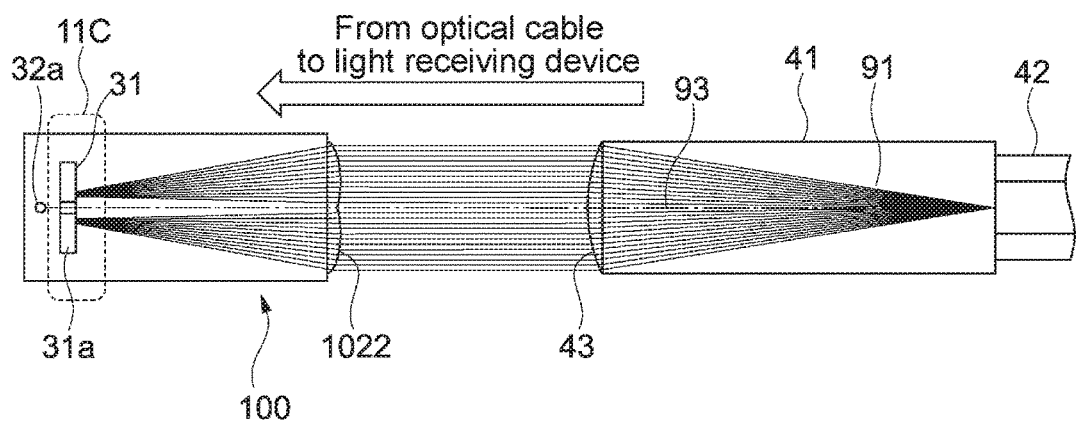
FIG. 11B  Upon transmission
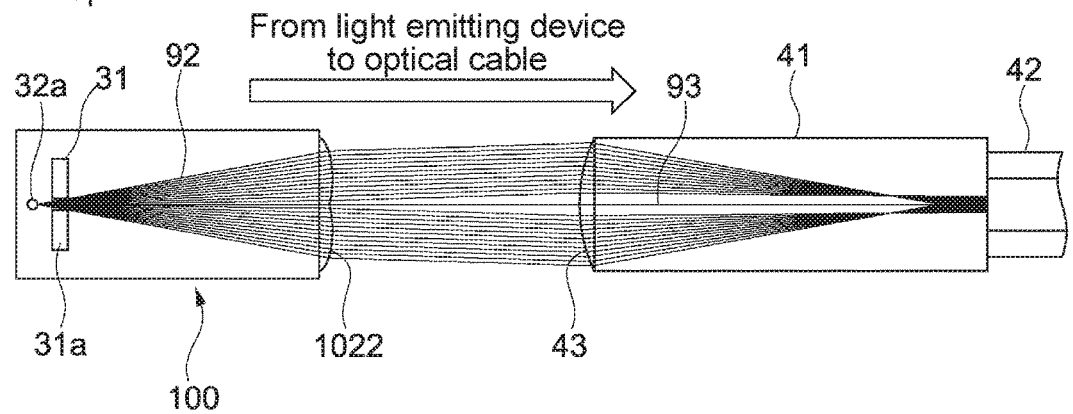
FIG. 11C
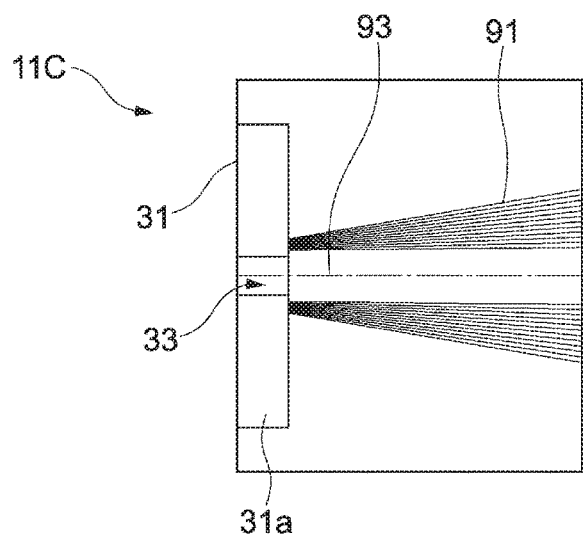

FIG. 13A  Upon reception
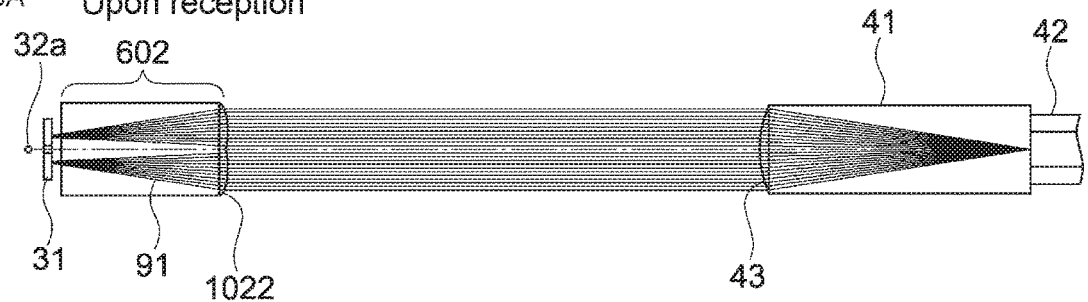
FIG. 13B  Upon transmission
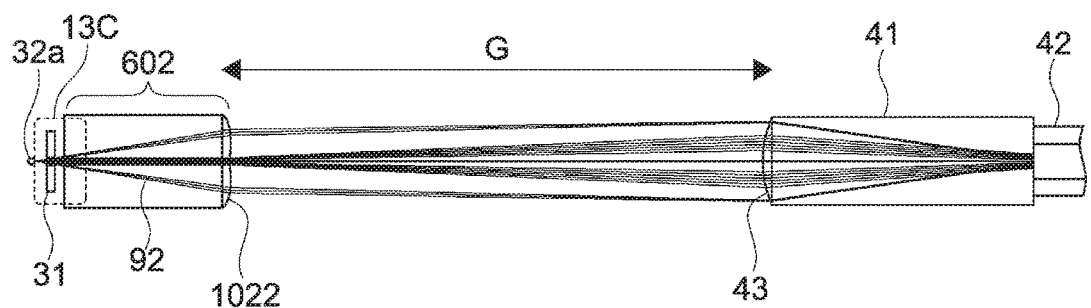
FIG. 13C
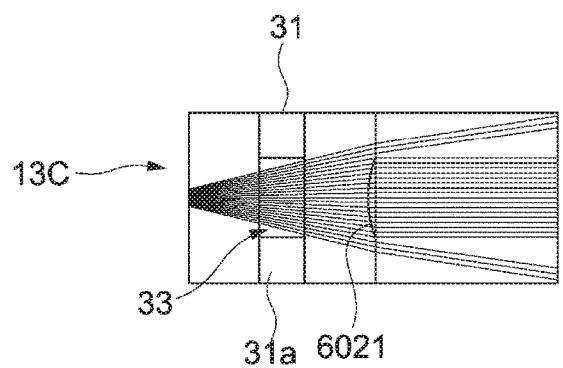

OPTICAL COUPLING DEVICE AND OPTICAL COMMUNICATION SYSTEM

CROSS REFERENCE TO RELATED APPLICATIONS

This application is a U.S. National Phase of International Patent Application No. PCT/JP2017/032420 filed on Sep. 8, 2017, which claims priority benefit of Japanese Patent Application No. JP 2016-207650 filed in the Japan Patent Office on Oct. 24, 2016. Each of the above-referenced applications is hereby incorporated herein by reference in its entirety.

TECHNICAL FIELD

The present technology relates to an optical coupling device, and an optical communication system using the same.

BACKGROUND ART

In an optical communication system using optical cable such as an optical fiber, single-core bi-directional optical communication module is used, for example. The single-core bi-directional communication module branches a reception optical path and a transmission optical path by using an optical filter (for example, see Patent Literature 1). However, this results in a large communication module having such a structure, which is unsuitable for short distance optical communication.

In contrast, it has been proposed that a light receiving device and a surface light emitting device are laminated for the purpose of downsizing (see Patent Literature 2, for example).

CITATION LIST

Patent Literature

Patent Literature 1: Japanese Patent Application Laid-open No. 2006-351608
Patent Literature 2: Japanese Patent Application Laid-open No. 2012-209345

DISCLOSURE OF INVENTION

Technical Problem

However, in the structure having the light receiving device and the surface light emitting device laminated, as an optical signal that entered the light receiving device from the optical fiber also enters the surface light emitting device, the light receiving device has poor light receiving efficiency of the optical signal and there is a problem that it results in poor communication quality.

The present technology is made in view of the above-mentioned circumstances, and it is an object of the present technology to provide an optical coupling device that efficiently receives an optical signal from an optical fiber and has improved communication quality, and an optical communication system using the same.

Solution to Problem

An optical coupling device according to an embodiment of the present technology includes a light receiving and emitting device and an optical device.

The light receiving and emitting device includes a light emitter that emits outgoing light, and a light receiver that receives incident light from outside. The light receiver has a light passing part through which the outgoing light passes. The light passing part is arranged on an optical axis of the incident light.

The optical device causes incident light around the optical axis of the incident light to be refracted so as to be apart from the optical axis and to enter the light receiver.

In the optical coupling device, even if the light receiver and the light emitter are arranged such that the light passing part through which the outgoing light passes is positioned on the optical axis of the outgoing light, the optical device has a structure that causes incident light around the optical axis to be refracted so as to be apart from the optical axis and to enter the light receiver. Thus, entering of the incident light toward the light emitter can be decreased, and entering of the incident light toward the light receiver can be increased.

The optical device may cause the incident light to enter the light receiver.

The light receiver may have a ring shape.

Since the light receiver and the light emitter are arranged such that the light passing part through which the outgoing light passes is positioned on the optical axis of the outgoing light, when the light receiver and the light emitter are projected on a surface orthogonal to the optical axis, the light receiver is positioned around the light emitter. Thus, the light receiver may have a ring shape including the light passing part positioned at a center. The incident light collected in a ring shape by the optical device efficiently enters the light receiver 31a, and the incident light hardly enters the light emitter.

The optical device may include a lens having a first curve surface that causes incident light around the optical axis of the incident light to be refracted so as to be apart from the optical axis and to enter the light receiver and a second curve surface that causes another light of the incident light to be refracted so as to be close to the optical axis.

Thus, the optical device may include the lens having two curves of the first curve surface and the second curve surface, and the first curve surface and the second curve surface may cause the incident light to be collected in a ring shape to the light receiver.

The optical device may include the lens, a substrate that has one surface on which the lens is arranged, and a lens arranged on another surface of the substrate that causes the outgoing light to be parallel light.

The optical coupling device may further include an optical path conversion device that converts an optical path of the outgoing light emitted from the light emitter and passed through the optical device and an optical path of the incident light before entering the optical device.

The optical device may be a Fresnel lens.
The optical device may be a refractive index distribution type lens.
The optical device may be a liquid crystal lens.
The optical device may include an incident and outgoing surface into which the outgoing light enters and from which the incident light goes out and a reflection surface that converts optical paths of the outgoing light and the incident light, and the incident and outgoing surface may include a first curve surface that causes incident light around the optical axis of the incident light to be refracted so as to be apart from the optical axis and to enter the light receiver and a second curve surface that causes another light of the incident light to be refracted so as to be close to the optical axis.

The optical device may include an incident and outgoing surface into which the outgoing light enters and from which the incident light goes out and a reflection surface that converts optical paths of the outgoing light and the incident light, and the reflection surface may include a first curve surface that causes incident light around the optical axis of the incident light to be refracted so as to be apart from the optical axis and to enter the light receiver and a second curve surface that causes another light of the incident light to be refracted so as to be close to the optical axis.

An optical communication system according to an embodiment of the present technology includes an optical cable and an optical coupling device.

The optical coupling device includes a light receiving and emitting device and an optical device. The light receiving and emitting device includes a light emitter that emits outgoing light, and a light receiver that receives incident light from the optical cable. The light receiver has a light passing part through which the outgoing light passes. The light passing part is arranged on an optical axis of the incident light. The optical device causes incident light around the optical axis of the incident light to be refracted so as to be apart from the optical axis and to enter the light receiver.

Advantageous Effects of Invention

As described above, according to the present technology, since entering of the outgoing light toward the light emitter from outside can be decreased, and the outgoing light can be efficiently collected to the light receiver, an optical coupling device and an optical communication system having excellent optical communication property can be provided.

It should be noted that the effects described here are not necessarily limitative and may be any of effects described in the present disclosure.

BRIEF DESCRIPTION OF DRAWINGS

FIGS. 11A and 11B show statuses of light beams upon reception and upon transmission respectively in optical communication using the optical coupling device according to the first embodiment.

FIGS. 13A and 13B show statuses of the light beams upon reception and upon transmission respectively in the optical communication using the optical coupling device according to the sixth embodiment.

MODE(S) FOR CARRYING OUT THE INVENTION

Hereinafter, embodiments of the present technology will be described with reference to the drawings. The present technology relates to a single-core bi-directional optical communication system using optical cable such as a single-core optical fiber as an optical transmission path, and an optical coupling device used for the system, and provides the optical coupling device suitable for short distance optical communication.

Basic Structure of Optical Coupling Device

Figure 1:
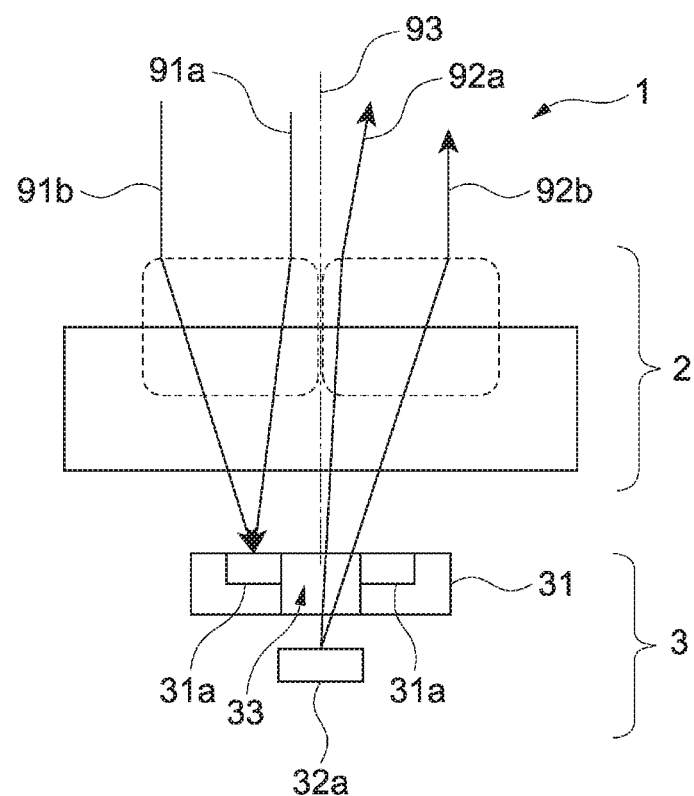
FIG. 1 is a diagram showing a basic structure of a main part of an optical coupling device according to the present technology.

FIG. 1 is a diagram showing a basic structure of an optical coupling device according to each embodiment of the present technology as described later.

As shown in FIG. 1, an optical coupling device 1 includes a light receiving and emitting device 3 and an optical device 2. The optical coupling device 1 is an optical coupling device for bi-directional transmission communication having a structure that a light receiving device 31 and a light emitting device (sign 32 in FIG. 9 described later) are laminated. An optical fiber is arranged at an optical device 2 side of the optical coupling device 1 and communication is performed.

The light receiving and emitting device 3 includes the light receiving device 31 and a light emitting device having a light emitter 32a.

The light receiving device 31 includes a light receiver 31a having a photodiode, for example. Incident light 91, i.e., incident light 91 (91a and 91b) from outside, transmitted from the optical fiber (not shown) enters the light receiver 31a through the optical device 2. A light passing part 33 that is a through-hole passing through along a direction of an optical axis 93 of the incident light 91 is formed at a center of the light receiving device 31.

The light emitter 32a includes a surface light emitting laser device, for example, and emits laser light (outgoing light) 92 (92a and 92b). The laser light (outgoing light) 92 emitted from the light emitter 32a passes through the light passing part 33 of the light receiver 31a, passes through the optical device 2, and goes out toward the optical fiber. As the light emitter 32a, a light emitting diode, an electroluminescence device, or the like may be used other than semiconductor laser including the surface light emitting laser device.

The optical coupling device 1 is designed such that the optical axis of the incident light 91 is coincident with the optical axis of outgoing light 92. The light receiver 31*a* and the light emitter 32*a* are laminated and arranged on the same optical axis 93 and the center of the light emitter 32*a* and the center of the light receiver 31*a* are positioned on the optical axis 93.

Figure 2:
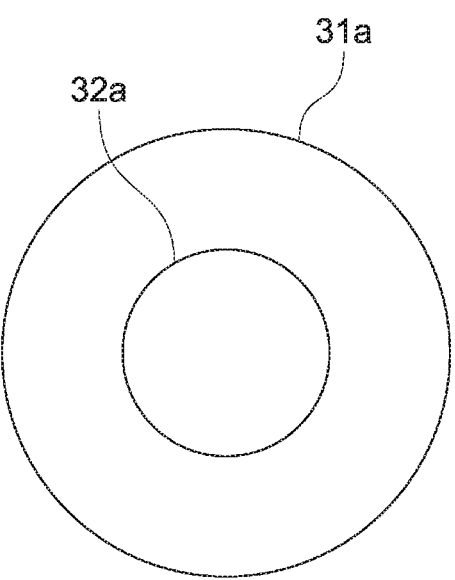
FIG. 2 is a schematic diagram showing a positional relationship between a light receiver and a light emitter of the optical coupling device according to the present technology.

FIG. 2 is a projection diagram that the light receiver 31*a* and the light emitter 32*a* are projected on a surface orthogonal to the optical axis 93. As shown in FIG. 2, the light receiver 31*a* is formed such that a projection shape of the surface orthogonal to the optical axis 93 of the incident light (91*a* and 91*b*) becomes a ring shape. The center of the ring-shaped light receiver 31*a* is a light passing part (through-hole) 33 having a circle planar shape which light can be passed. The center of the light receiver 31*a*, i.e., the center of the light passing part 33 is arranged on the optical axis 93 of the incident light 91. The light emitter 32*a* is arranged at the position of the light passing part 33.

Note that the shape of the light receiver 31*a* is not limited to the ring-shape and a plurality of island-shaped light receivers 31*a* may be positioned around the light emitter 32*a* in the projection diagram. In addition, outer shapes of the light receiver 31*a* and the light emitter 32*a* are circle, but are not limited thereto, and may be rectangular shapes, for example.

The incident light 91 from the optical fiber becomes parallel light by a condensing lens (sign 43 in FIGS. 11A and 11B described later) arranged at an optical fiber side and enters the optical coupling device 1. The optical device 2 causes the incident light 91*a* around the optical axis of the parallel incident light 91 to be refracted so as to be apart from the optical axis 93. In addition, the optical device 2 causes almost a greater part of the incident light 91 other than the incident light 91*a* around the optical axis to be refracted so as to be close to the optical axis 93.

Since the optical device 2 has such a structure, the incident light 91 is collected in a ring shape by the optical device 2 and enters the ring-shaped light receiver 31*a* but hardly enters the light emitter 32*a*. As a result, light receiving efficiency of the light receiver 31*a* becomes high and light communication using the optical coupling device allows a stable reception.

In addition, with the optical device 2 having the above-descried structure, laser light emitted from the light emitter 32*a* is reflected on a mirror or an end face of the optical fiber. Even if the laser light returns toward the light emitter 32*a* again, the returned light hardly enters the light emitter 32*a*. Accordingly, there is no chance to re-inject the returned light, to cause a laser oscillator to be unstable, and to change an output.

In addition, since the optical coupling device 1 has the structure that the light emitter 32*a* is arranged corresponding to the light passing part 33 of the light receiver 31*a*, and the light receiver 31*a* and the light emitter 32*a* are laminated, it is possible to be downsized and is suitable for short distance optical communication.

Note that in FIG. 1 and later described FIG. 3, FIG. 4, FIG. 5, and FIG. 8, several arrows representing light are shown for easy understanding of light refraction directions. Furthermore, in an area of the optical device 2 that causes the incident light 91 to be refracted so as to be apart from the optical axis 93, light that entered the area is referred to as the incident light 91*a* and light that goes out from the area is referred to as the outgoing light 92*a*. In addition, in an area of the optical device 2 that causes the incident light 91 to be refracted so as to be close to the optical axis 93, light that entered the area is referred to as the incident light 91*b* and light that goes out from the area is referred to as the outgoing light 92*b*.

In addition, in these drawings, the outgoing light 92 (92*a* and 92*b*) is shown at a right side and the incident light 91 (91*a* and 91*b*) is shown at a left side by using the optical axis 93 of the optical device 2 as a borderline. In fact, both of the outgoing light 92 and the incident light 91 have light distribution taking the optical axis 93 as an axis of rotational symmetry.

Next, a specific structure of the optical device 2 that causes the incident light 91 to be collected to the light receiver 31*a* in a ring shape will be described in illustrative first to sixth embodiments and other embodiments.

First Embodiment

An optical coupling device according to a first embodiment and an optical module using the same will be described. Hereinafter, components similar to the above-described components are denoted by the similar signs, and the description may be omitted.

Optical Coupling Device

Figure 3:
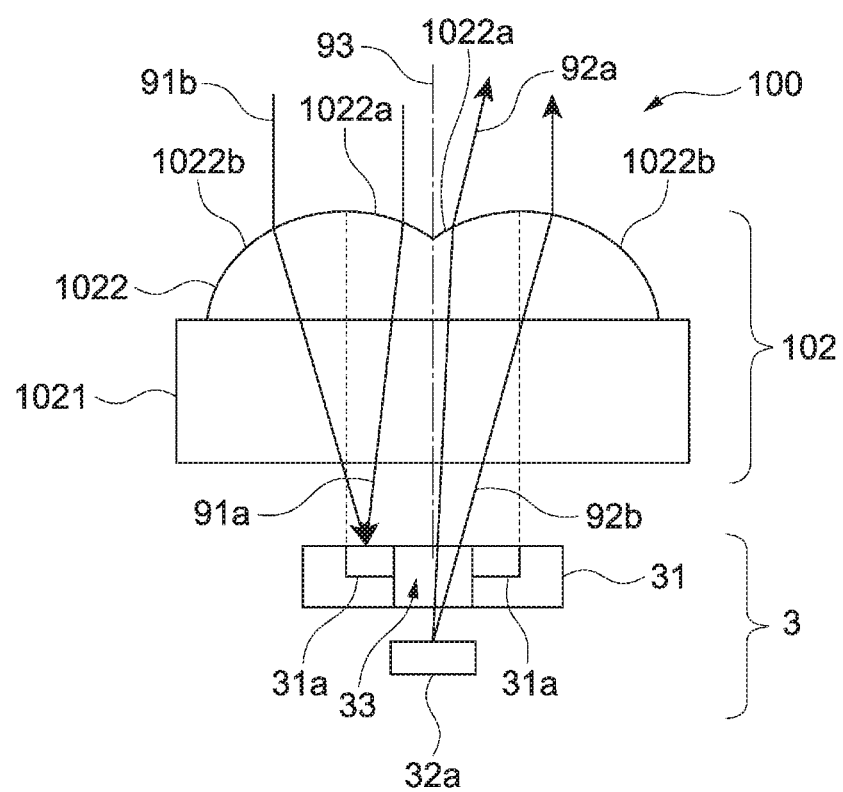
FIG. 3 is a diagram showing a basic structure of a main part of an optical coupling device according to a first embodiment of the present technology.

The optical coupling device according to the first embodiment will be described by using FIG. 3. FIG. 3 is a basic structure diagram of a main part of the optical coupling device according to the first embodiment.

As shown in FIG. 3, an optical coupling device 100 includes the light receiving and emitting device 3 and a lens substrate 102 as the optical device.

The lens substrate 102 includes a support substrate 1021 that is a transparent glass substrate through which light passes and a lens having two curves 1022 formed on one surface (surface positioned at optical fiber side upon communication) of the support substrate 1021. The lens having two curves 1022 is formed by resin molding, for example. Alternatively, the support substrate 1021 that supports the lens having two curves 1022 may not be the glass substrate but be transparent resin, and the support substrate 1021 and the lens having two curves 1022 may be formed by monolithic injection molding with resin. The material and the formation method of the lens substrate are not limited thereto.

The lens having two curves 1022 has a center positioned on the optical axis 93, and includes one planar surface (surface at support substrate 1021 side) and another lens-shaped surface having a slightly recessed center. The lens having two curves 1022 is a lens including first curve surfaces 1022*a* that are recessed around the center toward the center of the lens having two curves 1022 and second curve surfaces 1022*b*. The first curve surfaces 1022*a* and the second curve surfaces 1022*b* are formed in a rotation symmetry with respect to the optical axis 93.

Areas which the first curve surfaces 1022*a* are formed around the optical axis 93 are almost coincident with an outer shape of the light receiver 31*a* when the ring-shaped light receiver 31*a* is projected on the surface orthogonal to the optical axis 93.

The incident light 91 from the optical fiber becomes parallel light by the condensing lens (sign 43 in FIGS. 11A and 11B described later) arranged at the optical fiber side and enters the lens substrate 102. By passing through the lens substrate 102, the incident light 91*a* around the optical axis of the incident light 91 is refracted so as to be apart from the optical axis 93 by the first curve surfaces 1022*a* of the lens having two curves 1022. Other incident light 91b is refracted so as to be close to the optical axis 93 by the second curve surfaces 1022b.

FIGS. 11A and 11B show statuses of light beams upon reception and upon transmission respectively in the optical communication using the optical coupling device 100 according to the first embodiment. FIG. 11A shows a status upon reception, i.e., a status that the light receiver 31a of the light receiving device 31 receives the incident light 91 from the optical fiber. FIG. 11B shows a status upon transmission, i.e., a status that the outgoing light 92 emitted from the light emitter 32a of the light emitting device 32 is transmitted to the optical fiber. FIG. 11C is an enlarged diagram of the area surrounded by a dotted line of FIG. 11A.

In FIG. 11A and FIG. 11B, a sign 42 denotes the optical fiber, a sign 41 denotes an optical fiber holding member, a sign 43 denotes a condensing lens, and the optical fiber 42 is held by the optical fiber holding member 41. The condensing lens 43 causes the incident light 91 from the optical fiber 42 to be parallel light, collects the outgoing light 92 emitted from the light emitting device 32 and passed through the optical coupling device 100, and causes the outgoing light 92 to go out toward the optical fiber 42.

As shown in FIG. 11A and FIG. 11C, the incident light 91a around the optical axis 93 of the incident light 91 entered from the optical fiber 42 to the lens substrate 102 upon transmission is refracted so as to be apart from the optical axis 93 by the first curve surfaces 1022a. The incident light 91b that entered the second curve surfaces 1022b is refracted so as to be close to the optical axis 93. The incident light 91 is collected to the light receiver 31a in a ring shape, to thereby reducing entering of the incident light 91 to a light passing part (through-hole) 33. Thus, the light receiving efficiency of the light receiver 31a becomes high, and reception in the optical communication will be stable.

As shown in FIG. 11B, also in a case where the lens having two curves 1022, i.e., different two curves, is used, a spread angle of the outgoing light 92 emitted from the light emitter 32a upon transmission can be reduced by the lens having two curves 1022. Thus, a coupling loss to the optical fiber 42 can be maintained similar to the case that a normal condensing lens is used.

Figure 12:
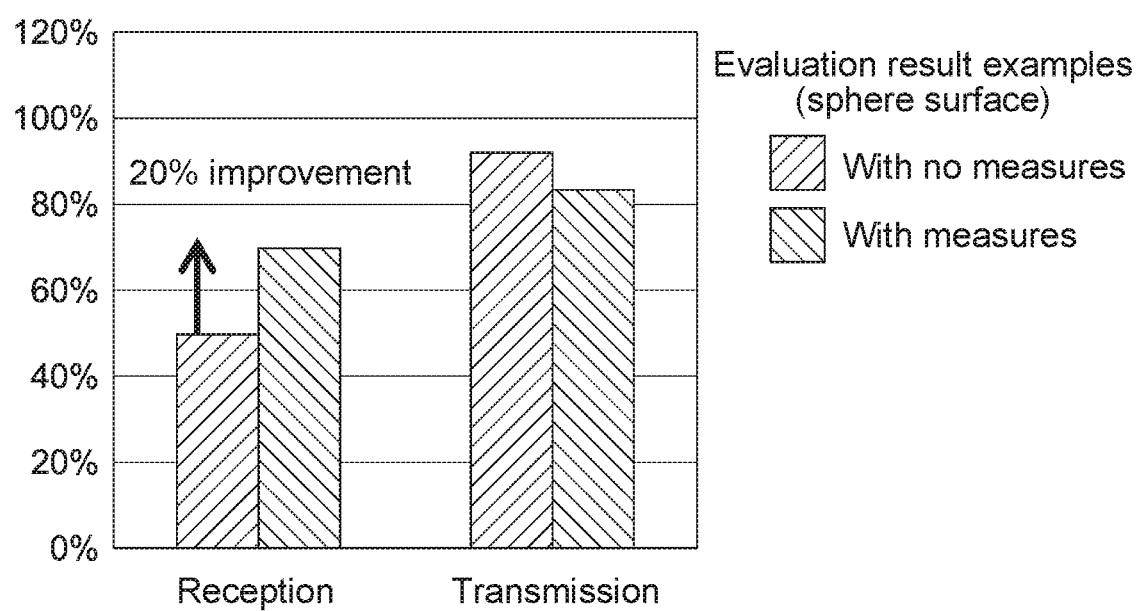
FIG. 12 shows light receiving efficiency of optical communication in a case where the optical coupling device according to the first embodiment is used.

FIG. 12 shows an illustrative comparison of the light receiving efficiency between the case that the optical coupling device including the lens having two curves 1022 according to the present embodiment (corresponds to "with measures" in FIG. 12) is used and the case that an optical coupling device including a normal condensing lens with no recessed center (corresponds to "with no measures" in FIG. 12) is used.

As showh in FIG. 12, upon reception that the incident light 91 from the optical fiber 42 is received at the light receiver, it reveals that the light receiving efficiency is significantly improved when the lens having two curves 1022 according to the present embodiment is used as compared with when the normal condensing lens is used.

On the other hand, upon transmission that the light emitter 32a emits the outgoing light, the efficiency is somewhat lower but almost the same when the lens having two curves 1022 according to the present embodiment is used as compared with when the normal lens is used. Even when the case that the lens having two curves 1022 according to the present embodiment is used, a coupling loss to the optical fiber 42 can be maintained similar to the case that the normal condensing lens is used.

Thus, by arranging the lens having two curves 1022, i.e., two different first curve surfaces 1022a and second curve surfaces 1022b, most of the incident light 91 that entered the lens substrate 102 from the optical fiber 42 is collected to the ring-shaped light receiver 31a and does not hardly enter the light emitter 32a. Accordingly, the light receiving efficiency of the light receiver 31a is improved and reception in the optical communication using such an optical coupling device will be stable.

Structure of Optical Coupling Device

Figure 9:
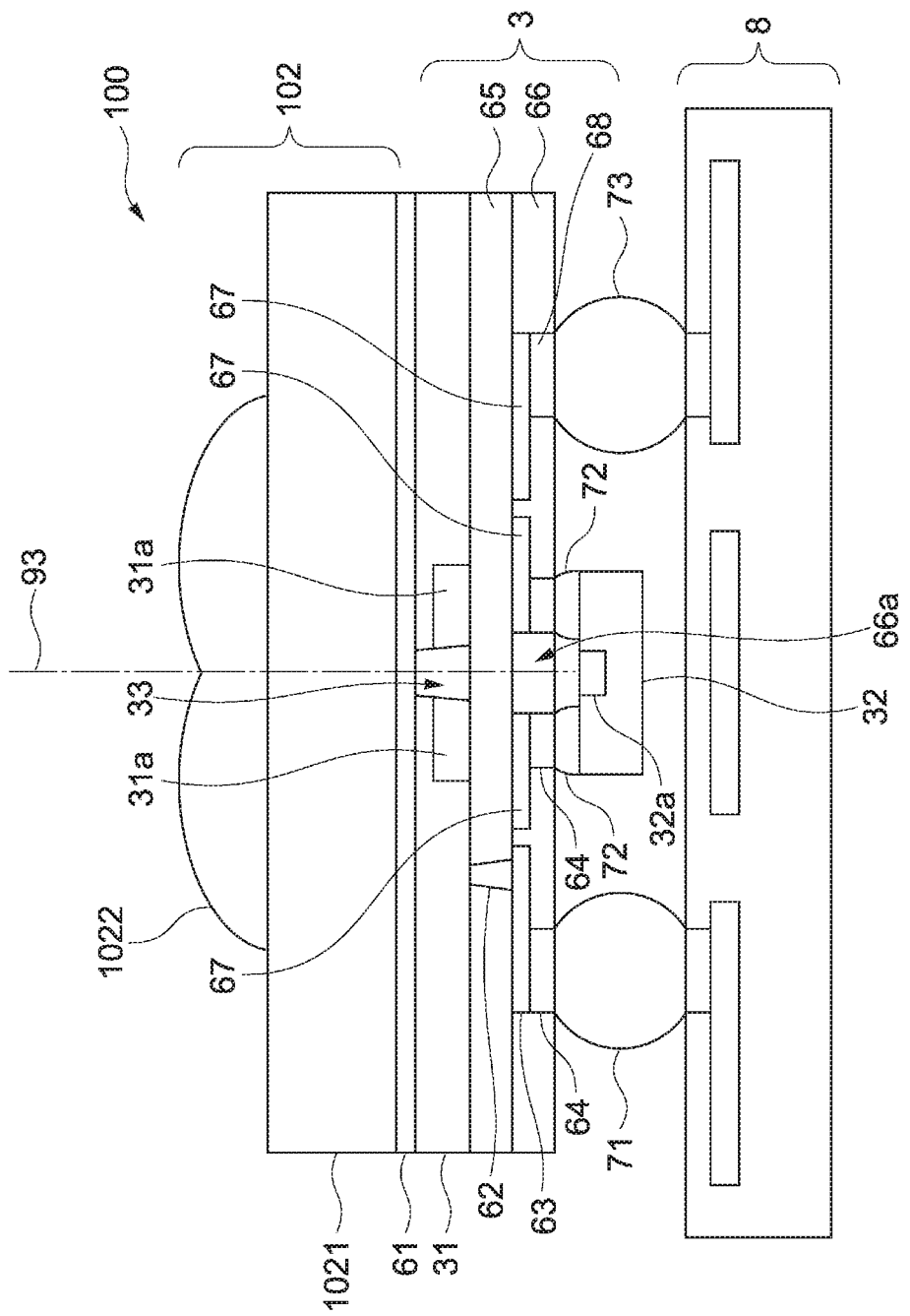
FIG. 9 is a cross-sectional diagram of the optical coupling device according to the first embodiment.

Next, using FIG. 9, the structure of the optical coupling device 100 will be described in detail. FIG. 9 is a cross-sectional diagram of the optical coupling device 100.

As shown in FIG. 9, the optical coupling device 100 includes the light receiving and emitting device 3, the lens substrate 102, and a mother board 8. The light receiving and emitting device 3 and the lens substrate 102 are adhered via a light-transmissive adhesion layer 61. The light receiving and emitting device 3 is electrically connected to the mother board 8 via bumps 71 and 73.

The light receiving and emitting device 3 includes the light receiving device 31, an insulation layer 65 having a connection hole 62 formed on the light receiving device 31, wiring layers 63 and 67 formed on the insulation layer 65, an insulation layer 66 that covers the wiring layers, and a light emitting device 32 including a light emitter 32a.

The light receiving device 31 is electrically connected to the wiring layer 63 via the connection hole 62, and the wiring layer 63 is further electrically connected to the mother board 8 via a pad 64 and the bump 71. The light emitting device 32 is electrically connected to the wiring layer 67 via the bump 72 and the pad 64, and the wiring layer 67 is electrically connected to the mother board 8 via a pad 68 and the bump 73.

The insulation layer 65 transmits light and light can pass therethrough. The insulation layer 66 has a through-hole 66a at an area corresponding to the light emitter 32a and light can pass therethrough. The light emitter 32a, the through-hole 66a, and the light passing part 33 are arranged so as to be positioned on the optical axis 93.

Structure of Optical Module

Figure 10:
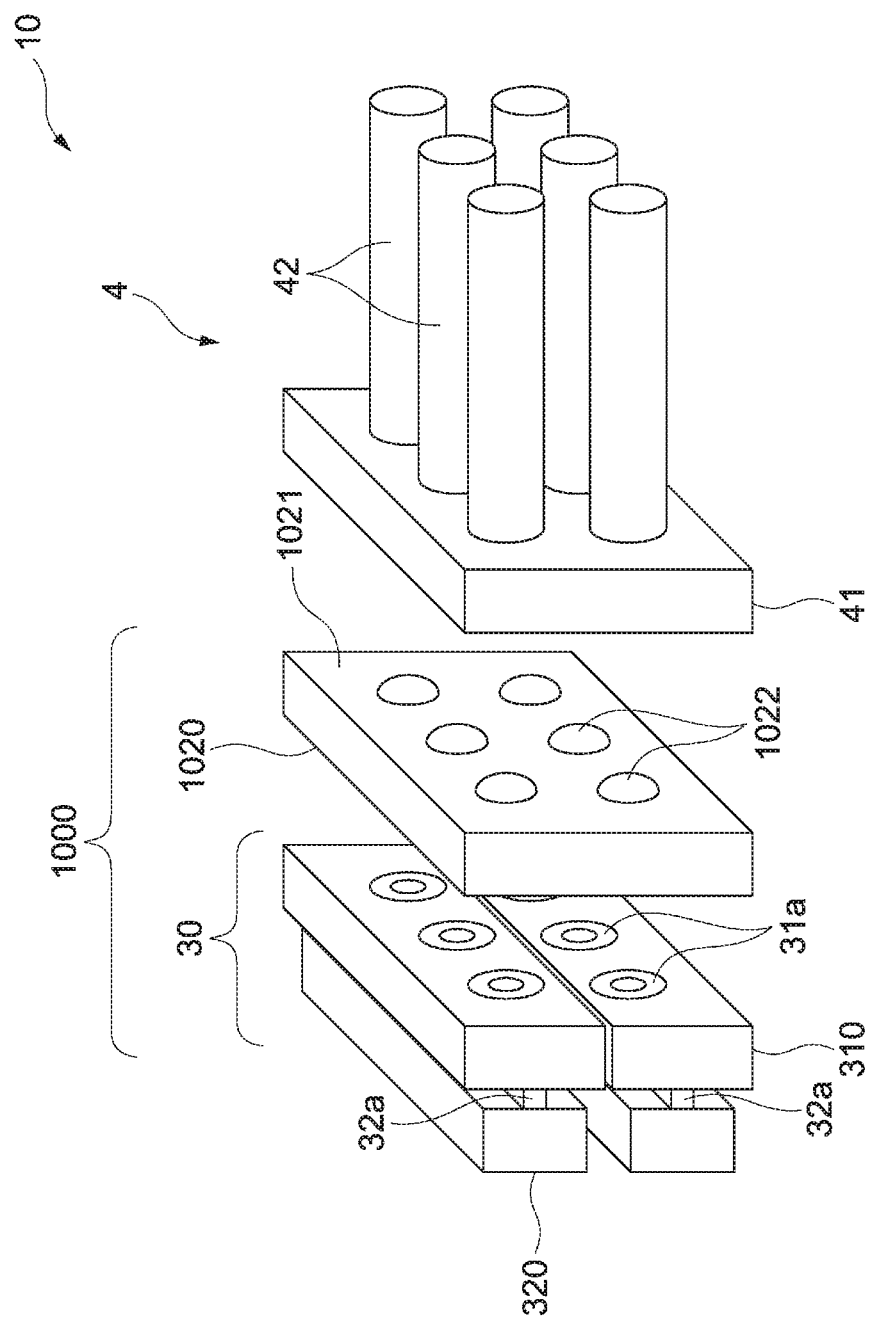
FIG. 10 is a schematic exploded perspective diagram showing a basic structure of an optical module including a plurality of optical coupling devices according to the first embodiment.

In general, a plurality of the above-described optical coupling devices 100 is arranged in arrays and is used for optical communication. Using FIG. 10, a structure of an optical module (bi-directional optical communication module) including the plurality of above-described optical coupling devices 100 in the arrays will be described. FIG. 10 is a schematic exploded perspective diagram of the optical module 10. Components similar to the above-described components are denoted by the similar signs, and the description may be omitted.

The optical module 10 includes an optical coupling device array 1000 having a plurality of optical coupling devices 100 arranged in arrays and an optical fiber array 4. The optical fiber array 4 includes six optical fibers 42, the optical fiber holding member 41 that holds the optical fibers 42, and six condensing lenses (not shown, correspond to the sign 43 in FIGS. 11A and 11B) arranged corresponding to the respective optical fibers 42.

The optical coupling device array 1000 includes a lens array substrate 1020 and a light receiving and emitting device array substrate 30. The lens array substrate 1020 includes a support substrate 1021 and six lenses each of which has two curves 1022 arranged in arrays on one surface of the support substrate 1021 at an optical fiber array 4 side.

The light receiving and emitting device array substrate 30 includes two light emitting array devices 320, each of which includes three light emitters 32a and two light receiving array devices 310, each of which includes three light receivers 31a.

Each of the light emitters 32a, each of the light receivers 31a, and each of lenses having two curves 1022 are correspondingly arranged on the optical axis 93. Also, each optical fiber 42 is correspondingly arranged to each lens having two curves 1022 of the optical coupling device array 1000 so as to position the optical axis 93 at the center in a surface orthogonal to a longitudinal direction of each optical fiber 42.

Note that it illustrates here that an optical path of the incident light 91 and an optical path of the outgoing light 92 are not converted. An optical path conversion device that converts the optical path at 90 degrees may be provided between the optical coupling device array 1000 and the optical fiber array 4. In addition, it illustrates that the optical coupling device 100 according to the first embodiment is used for the optical module. It should be appreciated that optical coupling devices 200, 300, 400, 500, 600 according to embodiments described later can be applied to the optical module.

Second Embodiment

Figure 4:
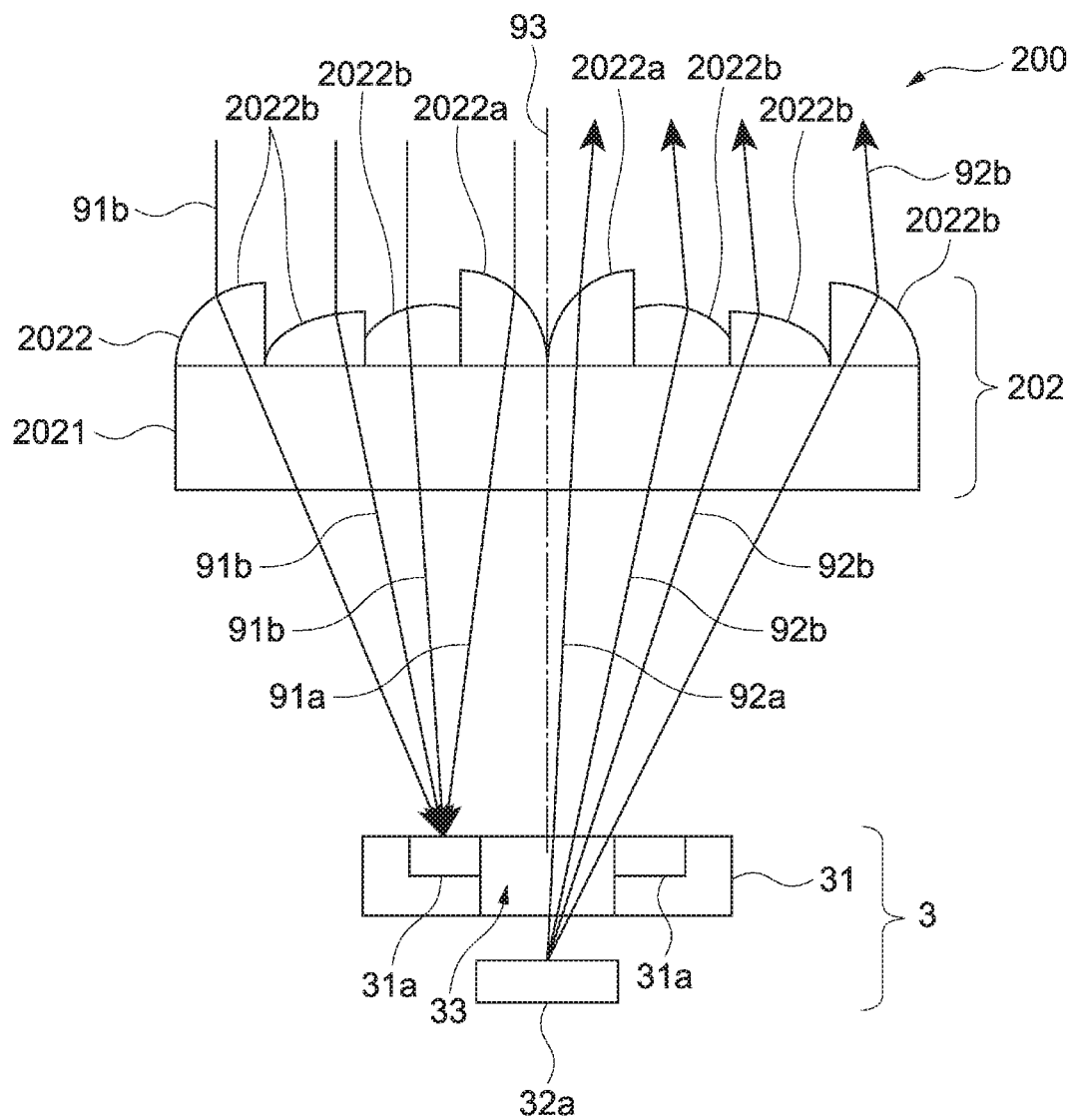
FIG. 4 is a diagram showing a basic structure of a main part of an optical coupling device according to a second embodiment of the present technology.

An optical coupling device according to a second embodiment will be described by using FIG. 4. FIG. 4 is a basic structure diagram of a main part of the optical coupling device according to the second embodiment. In the present embodiment, the structure of the optical device is different from that in the first embodiment. Hereinafter, components similar to the above-described components are denoted by the similar signs, and the description may be omitted.

As shown in FIG. 4, an optical coupling device 200 includes the light receiving and emitting device 3 and a Fresnel lens substrate 202 as the optical device.

The Fresnel lens substrate 202 includes support substrate 2021 that is a transparent support substrate through which light passes and a Fresnel lens 2022 formed on one surface of the support substrate 2021. Note that the support substrate 2021 and the Fresnel lens 2022 may be formed by monolithic injection molding with resin.

The Fresnel lens 2022 has a center positioned on the optical axis 93. The Fresnel lens 2022 has a plurality of circular grooves. The Fresnel lens 2022 has a first area 2022a that causes the incident light 91a around the optical axis 93 of the incident light 91 to be refracted so as to be apart from the optical axis 93 and a second area 2022b that causes the other incident light 91b to be refracted so as to be close to the optical axis 93.

The Fresnel lens 2022 also functions similar to the lens substrate 102 in the first embodiment and shows statuses of the light beams upon reception and upon transmission shown in FIGS. 11A and 11B. Specifically, by the first area 2022a around the center of the Fresnel lens 2022, the incident light 91a that entered the first area 2022a is refracted so as to be apart from the optical axis 93. In addition, by the second area 2022b excluding the center and therearound of the Fresnel lens 2022, the incident light 91b that entered the second area 2022b is refracted so as to be closer to the optical axis 93.

Thus, the incident light 91 from the optical fiber positioned outside the optical coupling device 200 is collected to the ring-shaped light receiver 31a by the first area 2022a and the second area 2022b of the Fresnel lens 2022 and does not hardly enter the light emitter 32a. Accordingly, the light receiving efficiency is improved and reception in the optical communication will be stable.

Third Embodiment

Figure 5:
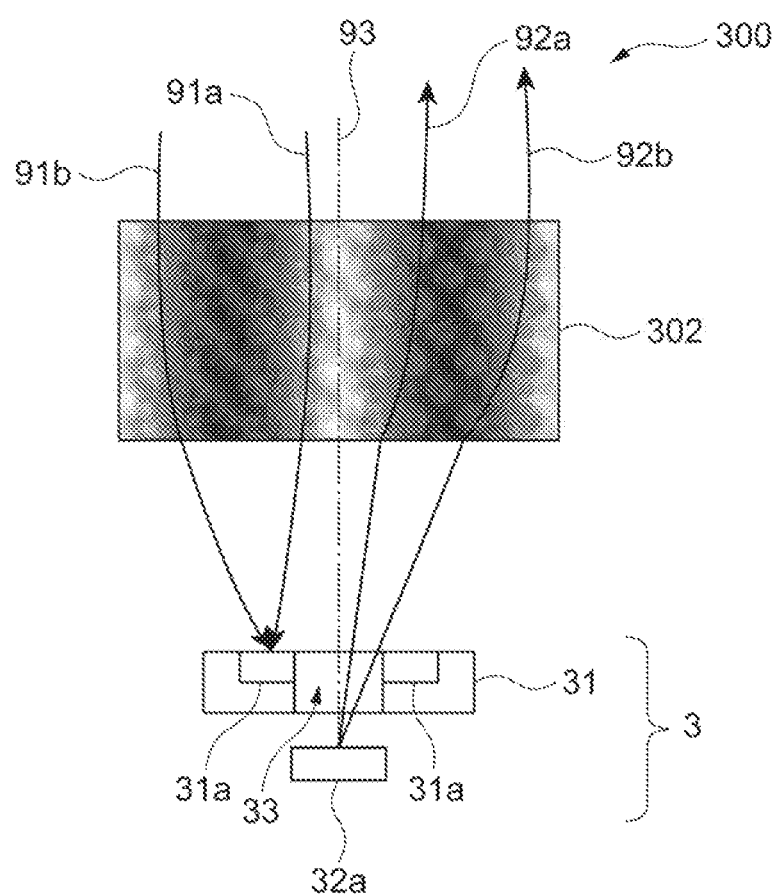
FIG. 5 is a diagram showing a basic structure of a main part of an optical coupling device according to a third embodiment of the present technology.

An optical coupling device according to a third embodiment will be described by using FIG. 5. FIG. 5 is a basic structure diagram of a main part of the optical coupling device according to the third embodiment. In the present embodiment, the structure of the optical device is different from that in the first embodiment. Hereinafter, components similar to the above-described components are denoted by the similar signs, and the description may be omitted.

As shown in FIG. 5, an optical coupling device 300 includes the light receiving and emitting device 3 and a refractive index distribution type lens 302 as the optical device.

The refractive index distribution type lens 302 is a lens having a cylindrical shape and a refractive index gradient in which a refractive index is changed in a radial direction (direction orthogonal to optical axis 93). In FIG. 5, magnitude of the refractive index is represented by dark and light using dots. The darker the color is, the higher the refractive index is.

As shown in FIG. 5, the refractive index is lowest at the center of the refractive index distribution type lens 302 positioned on the optical axis 93. And, in a circle cross section orthogonal to the optical axis 93 of the refractive index distribution type lens 302, the refractive index is changed such that the refractive index is continuously increased from the center of the circle to an outer shape of the circle and then is still continuously decreased. A center line of the refractive index distribution type lens 302 is almost coincident with the optical axis 93 and refractive index distribution is based on the optical axis 93.

By the area having high refractive index around the center (around optical axis) of the refractive index distribution type lens 302, the incident light 91a that entered the center and therearound and the outgoing light 92a that goes out from the center and therearound are refracted so as to be apart from the optical axis 93. In addition, by the area excluding the center and therearound of the refractive index distribution type lens 302, the incident light 91b that entered the area excluding the center and therearound and the outgoing light 92b that goes out from the area excluding the center and therearound are refracted so as to be closer to the optical axis 93. Thus, the incident light from the optical fiber positioned outside the optical coupling device 200 is collected to the ring-shaped light receiver 31a by the refractive index distribution type lens 302 and does not hardly enter the light emitter 32a. Accordingly, the light receiving efficiency is improved and reception in the optical communication will be stable.

Fourth Embodiment

Figure 6:
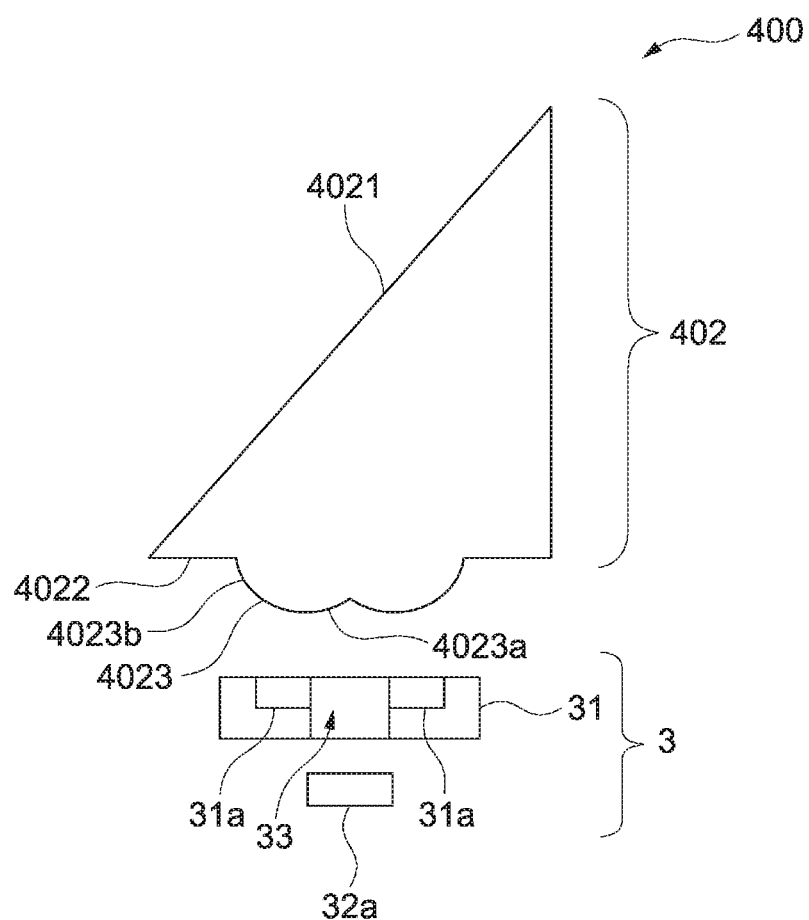
FIG. 6 is a diagram showing a basic structure of a main part of an optical coupling device according to a fourth embodiment of the present technology.

An optical coupling device according to a fourth embodiment will be described by using FIG. 6. FIG. 6 is a basic structure diagram of a main part of the optical coupling device according to the fourth embodiment. In the present embodiment, the structure of the optical device is different from that in the first embodiment. Also, the present embodiment is different from the first embodiment in that the optical path is converted by the optical device. Hereinafter, components similar to the above-described components are denoted by the similar signs, and the description may be omitted.

As shown in FIG. 6, an optical coupling device 400 includes the light receiving and emitting device 3 and an optical waveguide 402 as the optical device. The optical waveguide 402 according to the present embodiment converts the optical paths of the incident light 91 and the outgoing light 92 and causes the incident light 91 to be collected in a ring shape and to enter the ring-shaped light receiver 31a similar to the above-described embodiments.

The optical waveguide 402 is formed of a light-transmissive type transparent material. The optical waveguide 402 includes a reflection surface 4021 and an incident and outgoing surface 4022. The reflection surface 4021 that is the optical path conversion device is a slope at an angle of about 45 degrees with respect to the incident and outgoing surface 4022, reflects light that entered the optical waveguide 402, and converts the optical path of the light at 90 degrees. The incident and outgoing surface 4022 is a surface which the incident light 91 from the optical fiber having the optical path converted by the reflection surface 4021 goes out to the light receiver 31a and the outgoing light 92 emitted from the light emitter 32a enters.

The optical fiber is arranged at a surface side of 90 degrees with respect to the incident and outgoing surface 4022 of the optical waveguide 402. The light from the optical fiber enters the optical waveguide 402, is reflected at the reflection surface 4021, is subjected to optical path conversion at 90 degrees, goes out from the incident and outgoing surface 4022, and enters the light receiver 31a.

The outgoing light 92 emitted from the light emitter 32a enters from the incident and outgoing surface 4022 to the optical waveguide 402, is reflected at the reflection surface 4021, is subjected to the optical path conversion at 90 degrees, and is lead to the optical fiber.

The incident and outgoing surface 4022 includes a convex part 4023 having a first curve surface 4023a and a second curve surface 4023b. The shape of the convex part 4023 is similar to the shapes of the first curve surface 1022a and the second curve surface 1022b of the lens having two curves 1022 in the first embodiment.

The incident light 91a around the optical axis of the incident light 91 from the optical fiber is refracted so as to be apart from the optical axis by the first curve surface 4023a. The other incident light 91b is refracted so as to be close to the optical axis by the second curve surface 4023b.

Accordingly, the incident light 91 from the optical fiber positioned outside the optical coupling device 400 is collected in a ring shape to the light receiver 31a by the first curve surface 4023a and the second curve surface 4023b and does not hardly enter the light emitter 32a. Accordingly, the light receiving efficiency is improved and reception in the optical communication will be stable.

Fifth Embodiment

Figure 7:
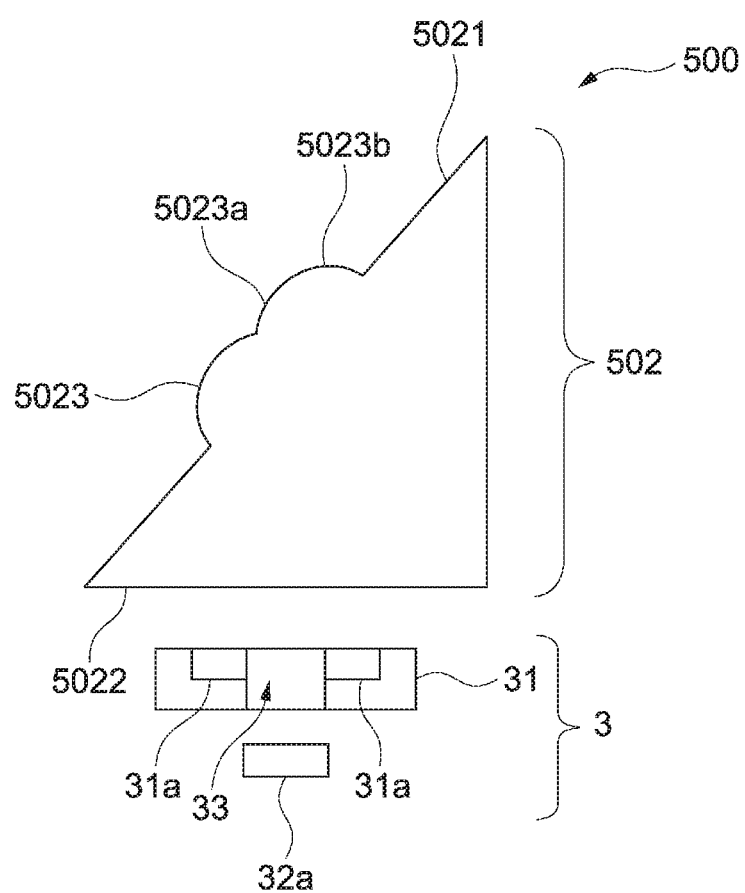
FIG. 7 is a diagram showing a basic structure of a main part of an optical coupling device according to a fifth embodiment of the present technology.

An optical coupling device according to a fifth embodiment will be described by using FIG. 7. FIG. 7 is a basic structure diagram of a main part of the optical coupling device according to the fifth embodiment. In the present embodiment, the structure of the optical device is different from that in the fourth embodiment. Also, the present embodiment is different from the fourth embodiment in that the first and second curve surfaces are formed at a reflection surface not at the incident and outgoing surface. Hereinafter, points different from those in the fourth embodiment will be mainly described, components similar to the above-described components are denoted by the similar signs, and the description may be omitted.

As shown in FIG. 7, an optical coupling device 500 includes the light receiving and emitting device 3 and an optical waveguide 502 as the optical device. The optical waveguide 502 according to the present embodiment converts the optical paths of the incident light and the outgoing light and causes the incident light 91 to be collected in a ring shape and to enter the ring-shaped light receiver 31a similar to the above-described embodiments.

The optical waveguide 502 is formed of a light-transmissive type transparent material. The optical waveguide 502 includes a reflection surface 5021 and an incident and outgoing surface 5022. The reflection surface 5021 is a slope at an angle of about 45 degrees with respect to the incident and outgoing surface 5022, reflects entered light, and converts the optical path of the light at 90 degrees. The incident and outgoing surface 5022 is a surface which the incident light 91 from the optical fiber having the optical path converted by the reflection surface 5021 goes out to the light receiver 31a and the outgoing light 92 emitted from the light emitter 32a enters.

The reflection surface 5021 includes a convex part 5023 having a first curve surface 5023a and a second curve surface 5023b. The shape of the convex part 5023 is similar to the shapes of the first curve surface 1022a and the second curve surface 1022b of the lens having two curves 1022 in the first embodiment.

The incident light 91a around the optical axis of the incident light 91 from the optical fiber is refracted so as to be apart from the optical axis by the first curve surface 5023a. The incident light 91b entering the second curve surface 5023b of the other incident light is refracted so as to be close to the optical axis 93.

Accordingly, the incident light 91 from the optical fiber is collected in a ring shape to the light receiver 31a by the first curve surface 5023a and the second curve surface 5023b and does not hardly enter the light emitter 32a. Accordingly, the light receiving efficiency is improved and reception in the optical communication will be stable.

Sixth Embodiment

Figure 8:
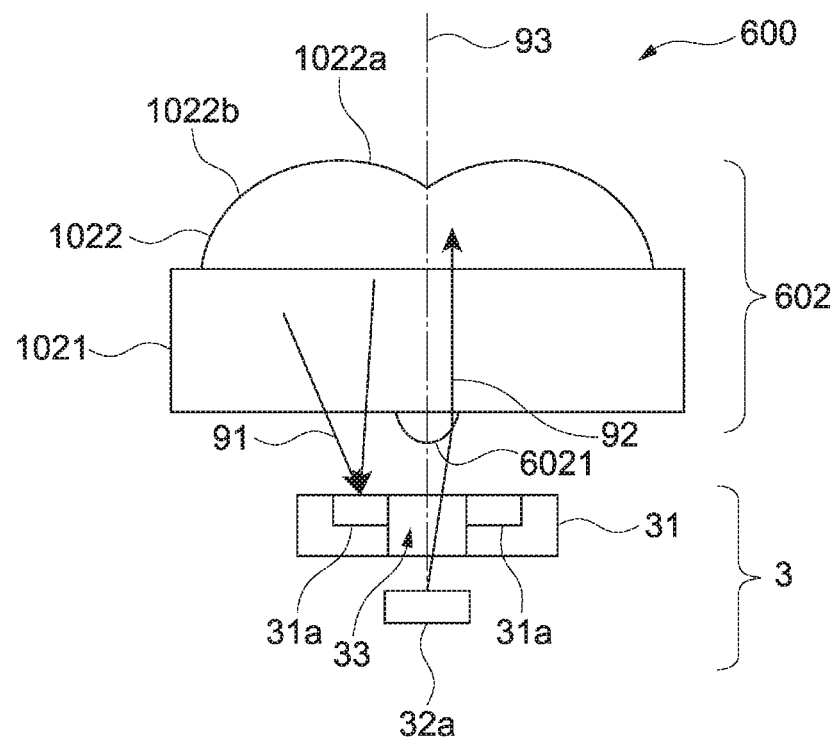
FIG. 8 is a diagram showing a basic structure of a main part of an optical coupling device according to a sixth embodiment of the present technology.

An optical coupling device according to a sixth embodiment will be described by using FIG. 8. FIG. 8 is a basic structure diagram of a main part of the optical coupling device according to the sixth embodiment. In the present embodiment, the structure is that a collimator lens is added to the lens substrate of the optical coupling device according to the first embodiment. Hereinafter, components similar to the above-described components are denoted by the similar signs, and the description may be omitted.

As shown in FIG. 8, an optical coupling device 600 includes the light receiving and emitting device 3 and a lens substrate 602 including a collimator lens as the optical device.

The lens substrate 602 including a collimator lens includes a support substrate 1021, a lens having two curves 1022 arranged on one surface of the support substrate 1021 (surface positioned at optical fiber side upon communication), and a collimator lens 6021 arranged on the other surface of the support substrate 1021 (surface at light receiving and emitting device side). Note that the support substrate 1021, the lens having two curves 1022, and the collimator lens 6021 may be formed by monolithic injection molding with resin.

The collimator lens 6021 causes the outgoing light 92 emitted from the light emitter 32*a* to be parallel light. The collimator lens 6021 is arranged on the optical axis 93 corresponding to the light passing part (through-hole) 33 and the light emitter 32*a*.

Thus, by further adding the collimator lens 6021 in addition to the structure according to the first embodiment, spreading of the outgoing light 92 from the light emitter 32*a* can be decreased, tolerance of the distance between the lens having two curves 1022 and a lens arranged at the optical fiber side (sign 43 in FIGS. 13A and 12B described later), and a design range becomes wide.

FIGS. 13A and 13B show statuses of the light beams upon reception and upon transmission respectively in the optical communication using the optical coupling device 600 according to the sixth embodiment. FIG. 13A shows a status upon reception, i.e., a status that the light receiver 31*a* receives the incident light from the optical fiber. FIG. 13B shows a status upon transmission, i.e., a status that the outgoing light 92 emitted from the light emitting device 32 is transmitted to the optical fiber. FIG. 13C is an enlarged diagram of the area surrounded by a dotted line of FIG. 13A.

As shown in FIG. 13B and FIG. 13C, the outgoing light 92 emitted from the light emitter 32*a* upon transmission enters the collimator lens 6021 through the light passing part 33. The outgoing light 92 that entered the collimator lens 6021 of the outgoing light 92 that entered the lens substrate 602 including a collimator lens becomes parallel light and goes out from the lens substrate 602 including a collimator lens through the support substrate 1021 and the lens having two curves 1022. The outgoing light 92 that did not entered the collimator lens 6021 also goes out from the lens substrate 602 including a collimator lens.

The outgoing light 92 that goes out from the lens substrate 602 including a collimator lens is collected to the condensing lens 43 and is transmitted to the optical fiber 42. As shown in FIG. 13B and FIG. 13C, by using the collimator lens 6021, spreading of the outgoing light 92 from the light emitter 32*a* can be decreased and the light can be efficiently collected and transmitted to the optical fiber 42. Thus, tolerance of a distance G between the lens having two curves 1022 and the condensing lens 43 is increased and design freedom is improved.

As shown in FIG. 13A, even in a case where the collimator lens 6021 is arranged, similar to the first embodiment, most of the incident light 91 that entered the lens substrate 602 including a collimator lens from the optical fiber 42 held by the optical fiber holding member 41 is collected to the ring-shaped light receiver 31*a* and does not hardly enter the light emitter 32*a*. Accordingly, the light receiving efficiency of the light receiver 31*a* becomes high and reception in the optical communication using such an optical coupling device will be stable.

Other Embodiments

While the present technology is described herein with reference to illustrative embodiments for particular applications, it should be understood that the present technology is not limited to the above-described embodiments and variations and modifications may be added.

In the above-described first to third and sixth embodiments, a reflector (optical path conversion mirror) may be further arranged. The reflector is the optical path conversion device that converts the optical path of the outgoing light 92 emitted from the light emitter 32*a* and passed through the optical device and the optical path of the incident light 91 before entering the optical device at 90 degrees, for example.

In addition, in the sixth embodiment, it shows the structure that the collimator lens 6021 is mounted to the lens substrate 102 including the lens having two curves 1022 described in the first embodiment. However, it is not limited thereto, the collimator lens may be arranged at a receiving and emitting light device substrate side of the optical device shown in the second to fifth embodiments, for example.

Furthermore, in the first embodiment, the lens having two curves is used, but is not limited to the curves. The lens may be planar or may have any shapes that cause to collect light in a ring shape. Also, a liquid crystal lens having a light collecting action may be used as the optical device.

Optical Communication System

Figure 14:
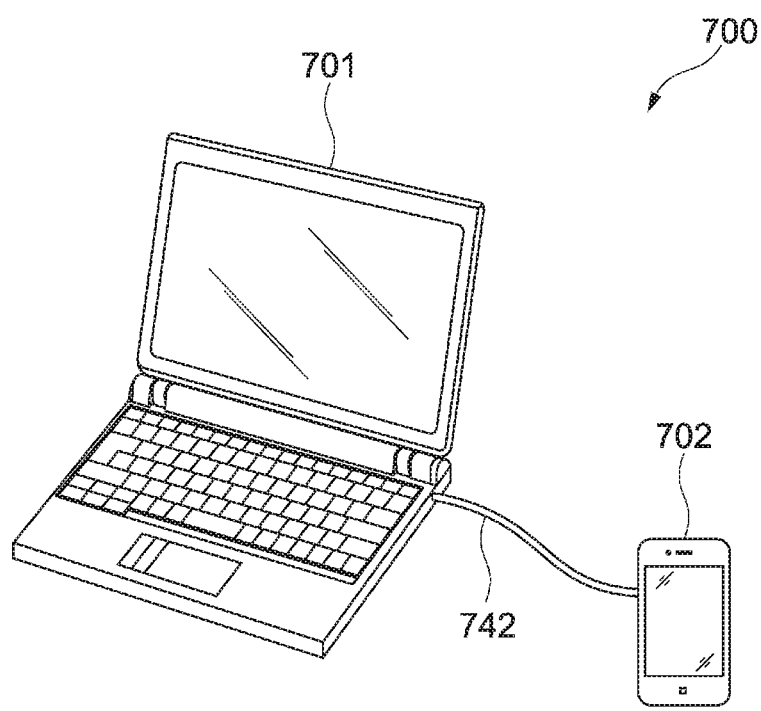
FIG. 14 shows an optical communication system using the optical coupling device according to the present technology.

Next, an optical communication system using the above-described optical coupling device will be described. FIG. 14 is an example of an optical communication system 700. The optical communication system 700 has a structure that optical communication apparatuses including the above-described optical coupling devices are connected with each other via an optical fiber cable 742 including the optical fiber 42 to realize bi-directional communication. Here, as the optical communication apparatuses, a personal computer 701 and a mobile phone 702 are illustrated, but a camera, a music player, a video camera, a printer, a storage device, or the like can be used other than those.

In such an optical communication system 700, since the optical coupling device having improved light receiving efficiency is used, a stable reception is possible.

The present technology may also have the following structures.

(1) An optical coupling device, including:

a light receiving and emitting device including a light emitter that emits outgoing light, and a light receiver that receives incident light from outside, the light receiver having a light passing part through which the outgoing light passes, the light passing part being arranged on an optical axis of the incident light; and an optical device that causes incident light around the optical axis of the incident light to be refracted so as to be apart from the optical axis and to enter the light receiver.

(2) The optical coupling device according to (1), in which the optical device causes the incident light to enter the light receiver.

(3) The optical coupling device according to (1) or (2), in which the light receiver has a ring shape.

(4) The optical coupling device according to any of (1) to (3), in which the optical device includes a lens having a first curve surface that causes incident light around the optical axis of the incident light to be refracted so as to be apart from the optical axis and to enter the light receiver and a second curve surface that causes another light of the incident light to be refracted so as to be close to the optical axis.

(5) The optical coupling device according to (4), in which the optical device includes the lens, a substrate that has one surface on which the lens is arranged, and a lens arranged on another surface of the substrate that causes the outgoing light to be parallel light.

15

(6) The optical coupling device according to (4), further including:
an optical path conversion device that converts an optical path of the outgoing light emitted from the light emitter and passed through the optical device and an optical path of the incident light before entering the optical device.
(7) The optical coupling device according to (2) or (3), in which
the optical device is a Fresnel lens.
(8) The optical coupling device according to (2) or (3), in which
the optical device is a refractive index distribution type lens.
(9) The optical coupling device according to (2) or (3), in which
the optical device is a liquid crystal lens.
(10) The optical coupling device according to (2) or (3), in which
the optical device includes an incident and outgoing surface into which the outgoing light enters and from which the incident light goes out and a reflection surface that converts optical paths of the outgoing light and the incident light, and
the incident and outgoing surface includes a first curve surface that causes incident light around the optical axis of the incident light to be refracted so as to be apart from the optical axis and to enter the light receiver and a second curve surface that causes another light of the incident light to be refracted so as to be close to the optical axis.
(11) The optical coupling device according to (2) or (3), in which
the optical device includes an incident and outgoing surface into which the outgoing light enters and from which the incident light goes out and a reflection surface that converts optical paths of the outgoing light and the incident light, and
the reflection surface includes a first curve surface that causes incident light around the optical axis of the incident light to be refracted so as to be apart from the optical axis and to enter the light receiver and a second curve surface that causes another light of the incident light to be refracted so as to be close to the optical axis.
(12) The optical coupling device according to any of (7) to (9), further including:
an optical path conversion device that converts optical paths of the incident light and the outgoing light.
(13) The optical coupling device according to any of (1) to (3), (7) to (12), in which
the optical device includes a lens that causes the outgoing light to be parallel light.
(14) An optical communication system, including:
an optical cable; and
an optical coupling device including
a light receiving and emitting device including a light emitter that emits outgoing light, and a light receiver that receives incident light from the optical cable, the light receiver having a light passing part through which the outgoing light passes, the light passing part being arranged on an optical axis of the incident light, and
an optical device that causes incident light around the optical axis of the incident light to be refracted so as to be apart from the optical axis and to enter the light receiver.

REFERENCE SIGNS LIST 1, 100, 200, 300, 400, 500, 600 optical coupling device
2 optical device

16

3 light receiving and emitting device
31a light receiver
32a light emitter
33 light passing part (through-hole)
91 incident light
92 outgoing light
93 optical axis
102 lens substrate
202 Fresnel lens substrate
302 refractive index distribution type lens
402, 502 optical waveguide
602 lens substrate including collimator lens
700 optical communication system
1021 support substrate
1022 lens having two curves
1022a, 4023a, 5023a first curve surface
1022b, 4023b, 5023b second curve surface
2022 Fresnel lens
4021, 5021 reflection surface
4022, 5022 incident and outgoing surface
6021 collimator lens

The invention claimed is:

1. An optical coupling device, comprising:
a light receiving and emitting device including:
a light emitter configured to emit outgoing light, and
a light receiver configured to receive incident light from outside of the optical coupling device, wherein
the light receiver includes a light passing part through which the outgoing light passes,
the light passing part is on an optical axis of the incident light; and
an optical device that includes:
an incident and outgoing surface into which the outgoing light enters and from which the incident light goes out, and
a reflection surface configured to convert an optical path of the outgoing light and an optical path of the incident light, wherein
the incident and outgoing surface includes:
a first curve surface configured to:
refract first light of the incident light so as to be apart from the optical axis, wherein the first light of the incident light is around the optical axis, and
cause the refracted first light of the incident light to enter the light receiver, and
a second curve surface configured to refract second light of the incident light so as to be close to the optical axis.

2. The optical coupling device according to claim 1, wherein the light receiver has a ring shape.

3. The optical coupling device according to claim 2, wherein
the optical device further includes a first lens, and
the first lens includes:
a third curve surface configured to:
refract the first light of the incident light so as to be apart from the optical axis, and
cause the refracted first light of the incident light to enter the light receiver, and
a fourth curve surface configured to refract the second light of the incident light so as to be close to the optical axis.

4. The optical coupling device according to claim 3, wherein
the optical device further includes a second lens and a substrate, the first lens is on a first surface of the substrate, the second lens is on a second surface of the substrate, and the second lens is configured to cause the outgoing light to be parallel light.

5. The optical coupling device according to claim 3, further comprising an optical path conversion device configured to convert:

the optical path of the outgoing light emitted from the light emitter and passed through the optical device, and the optical path of the incident light before entering the optical device.

6. The optical coupling device according to claim 1, wherein the optical device is a Fresnel lens.

7. The optical coupling device according to claim 1, wherein the optical device is a refractive index distribution type lens.

8. The optical coupling device according to claim 1, wherein the optical device is a liquid crystal lens.

9. The optical coupling device according to claim 1, wherein the reflection surface includes:

a third curve surface configured to:

refract the first light of the incident light so as to be apart from the optical axis, and cause the refracted first light of the incident light to enter the light receiver, and a fourth curve surface configured to refract the second light of the incident light so as to be close to the optical axis.

10. An optical communication system, comprising:

an optical cable; and an optical coupling device including:

a light receiving and emitting device including:

a light emitter configured to emit outgoing light, and a light receiver configured to receive incident light from the optical cable, wherein the light receiver includes a light passing part through which the outgoing light passes, the light passing part is on an optical axis of the incident light, and an optical device that includes:

an incident and outgoing surface into which the outgoing light enters and from which the incident light goes out, and a reflection surface configured to convert an optical path of the outgoing light and an optical path of the incident light, wherein the incident and outgoing surface includes:

a first curve surface configured to:

refract first light of the incident light so as to be apart from the optical axis, wherein the first light of the incident light is around the optical axis, and cause the refracted first light of the incident light to enter the light receiver, and a second curve surface configured to refract second light of the incident light so as to be close to the optical axis.

11. An optical coupling device, comprising:

a light receiving and emitting device including:

a light emitter configured to emit outgoing light, and a light receiver configured to receive incident light from outside of the optical coupling device, wherein the light receiver includes a light passing part through which the outgoing light passes, the light passing part is on an optical axis of the incident light; and an optical device that includes:

an incident and outgoing surface into which the outgoing light enters and from which the incident light goes out, and a reflection surface configured to convert an optical path of the outgoing light and an optical path of the incident light, wherein the reflection surface includes:

a first curve surface configured to:

refract first light of the incident light so as to be apart from the optical axis, wherein the first light of the incident light is around the optical axis, and cause the refracted first light of the incident light to enter the light receiver, and a second curve surface configured to refract second light of the incident light so as to be close to the optical axis.

* * * * *